(12) United States Patent
Erlmann (10) Patent No.: US 6,881,152 B2
(45) Date of Patent: Apr. 19, 2005

(54) FLANGE YOKE

(75) Inventor: Nikolaus Martin Erlmann, Düsseldorf (DE)

(73) Assignee: Spicer Gelenkwellenbau GmbH & Co. KG (DE)

( * ) Notice: Subject to any disclaimer, the term of this patent is extended or adjusted under 35 U.S.C. 154(b) by 0 days.

(21) Appl. No.: 10/642,457

(22) Filed: Aug. 15, 2003

(65) Prior Publication Data

US 2004/0097290 A1 May 20, 2004

Related U.S. Application Data

(63) Continuation of application No. PCT/EP01/15296, filed on Dec. 22, 2001.

(30) Foreign Application Priority Data

Feb. 17, 2001 (DE) .......................................... 101 07 605

(51) Int. Cl.[7] ................................................ F16D 3/16
(52) U.S. Cl. .......................................... 464/135; 403/8
(58) Field of Search ................................ 464/135, 134, 464/130, 112, 905; 403/6–8

(56) References Cited

U.S. PATENT DOCUMENTS

| 1,676,436 A | * | 7/1928 | Hamlin ........................ 464/132 |
| 1,999,487 A | | 4/1935 | Swenson |
| 2,255,604 A | * | 9/1941 | Warner ........................ 464/130 |
| 2,698,527 A | | 1/1955 | Anderson |
| 4,167,859 A | | 9/1979 | Okuda |
| 4,191,487 A | * | 3/1980 | Schultenkamper .......... 403/337 |
| 4,522,608 A | * | 6/1985 | Joyner ........................ 464/134 |

FOREIGN PATENT DOCUMENTS

| DE | 624185 | 1/1936 |
| FR | 2165014 | 8/1973 |
| GB | 511475 | 1/1939 |
| JP | 11-51073 | 2/1999 |

* cited by examiner

Primary Examiner—Kenn Thompson
(74) Attorney, Agent, or Firm—MacMillan, Sobanski & Todd, LLC (57) ABSTRACT

A flange yoke for universal joints includes a flange element having a longitudinal axis, two first attachment faces arranged on a first end face, and a connection face arranged on a second end face. The flange yoke also has two bearing elements having, respectively, a bearing bore, a second attachment face abutting one of the first attachment faces, and at least two blind holes with internal threads that extend parallel to the longitudinal axis and that start from the second attachment faces. To each blind hole, a through bore, extending parallel to the longitudinal axis, is arranged in the flange element. The through bores start from the connection face and end in one of the first attachment faces. The attachment screws are passed through the through bores and sit in the blind holes. By this, it is ensured, that the cross-sectional area of the bearing elements in a plane, formed by the journals of a journal cross, is not reduced by a bore and the highest possible torque capacity is achieved.

19 Claims, 13 Drawing Sheets

FLANGE YOKE

CROSS REFERENCE TO RELATED APPLICATION

This application is a continuation of International Application No. PCT/EP01/15296, filed Dec. 22, 2001, which claims priority from German Patent Application No. 10107605.3, filed Feb. 17, 2001. The disclosures of both applications are incorporated herein by reference.

BACKGROUND OF THE INVENTION

The invention relates to a flange yoke for universal joints, especially for the transmission of high torques.

German Patent Application No. 2,636,752 A1 discloses a universal joint wherein two yokes are connected to each other via a journal cross. The journal cross includes four journals that are arranged in pairs on a common axis, wherein the axes of two pairs intersect each other at a right angle. The joint yokes comprise, respectively, two bearing elements in which respective bearing bores are provided for receiving a journal of the journal cross. The bearing elements of one yoke are connected by means of attachment screws to a counter-flange. The bearing elements have, respectively, two through bores that extend parallel to a longitudinal axis of the yoke. In the counter-flange, threaded bores are provided in which the attachment screws, passed through the through bores, sit. The cross sectional area of the bearing elements in the plane that is formed by the journal cross is reduced because of the through bores, in comparison to a non-split yoke. This leads to the fact that the maximum transmissible torque is reduced. To achieve the same torque capacity as in a non-split yoke, the bearing elements would have to be designed larger, whereby the rotational diameter of the universal joint would be increased.

SUMMARY OF THE INVENTION

The object of the present invention is to propose a flange yoke for universal joints that enables in a split flange yoke the highest possible torque capacity.

The object is solved according to the invention by means of a flange yoke for universal joints, especially for universal joints for the transmission of high torque, including a flange element that has a longitudinal axis, two first attachment faces that are arranged offset to each other by 180° on a first end face of the flange element on a common circumference around the longitudinal axis, and a connection face that is arranged on a second end face of the flange element and by which the flange element is connectable to a counter-flange. The flange yoke also includes two bearing elements that have respective bearing bores, wherein the bearing bores of the two bearing elements are arranged co-axially on a common bore axis, and wherein the bore axis intersects the longitudinal axis of the flange element at a right angle. Each of the bearing elements has a second attachment face that abuts one of the first attachment faces of the flange element. At least two blind holes with internal threads extend parallel to the longitudinal axis and start from the second attachment face, wherein for each blind hole a through bore is arranged that extends parallel to the longitudinal axis of the flange element. The through bores start respectively from a first clamping face and end in one of the first attachment faces. Attachment screws are passed through the through bores and are supported, respectively, via a screw nut or a screw head on the respective first clamping face and sit in the blind holes.

Therefore, it is achieved that the cross-section of the bearing elements in the plane that is formed by a journal cross of a universal joint is not reduced additionally by bores for attachment screws. Furthermore, no abutment faces for screw heads have to be provided on the ends of the bearing elements that are arranged distanced from the flange elements. Therefore, the bearing elements can be formed conically reduced towards this end, i.e., the flanks of the bearing elements that extend from the second attachment face to the end of the bearing element facing away from the flange element and are arranged lateral of the bearing bore can take up a larger angle in reference to an axis extending parallel to the longitudinal axis. Hereby, it is achieved that the attachment face can be formed larger. Furthermore, it is prevented that screw heads at the end of the bearing element facing away from the flange element collide with components of the other flange yoke at large bending angles.

To take up the screw ends of the attachment screws sunk in the first clamping face, it is provided that respectively, starting from the first clamping face, the through bores merge into a bore having a larger diameter that ends in the connection face. As in this case, the attachment screws are passed through the through bores in the flange element starting from the connection face, and easy accessibility of the attachment screws is ensured.

It can also be provided that the flange element has an outer circumferential face provided with recesses forming the first clamping face. It can further be provided that the flange element has an outer circumferential face provided with a circumferential groove forming the first clamping face. In these embodiments, the attachment screws are firstly screwed into the blind holes of the bearing elements and then, starting from the attachment faces of the flange element, are inserted through the through bores and are secured on the side of the clamping faces, respectively, by a nut. The clamping faces and the connection faces are, therefore, arranged axially distanced in the direction of the longitudinal axis. This is especially necessary when long base dimensions, i.e., a large distance between the connection face and the attachment faces, are required.

To ensure that the attachment screws are not acted upon by shearing forces, it is provided that the first attachment faces, as well as the second attachment faces, have means for the transmission of forces in a plane arranged at a right angle to the longitudinal axis. Furthermore, means for centering the bearing elements can be provided. The means for the transmission of forces and for centering can be formed such that the first attachment faces of the flange element have, respectively, a groove extending radially to the longitudinal axis, and further such that the second attachment faces of the bearing elements are, respectively, formed correspondingly. Alternatively, it can be provided that the first attachment faces have toothings, and that the second attachment faces have toothings formed complimentary to the first toothings. In this case, it can be provided that the teeth of the toothings have, respectively, a first tooth flank, extending at a steep angle to a plane arranged at a right angle to the longitudinal axis and have, respectively, a second tooth flank extending at a low-gradient angle to the plane. Because of the steep extending first flank, transversal forces in a direction perpendicular to the longitudinal axis can be taken up positively. By means of the second flank extending with a low gradient angle, it is ensured that the clamping forces of the attachment screws, as well as the bearing forces in the direction of the longitudinal axis, can be taken up.

The teeth of the toothings can extend parallel to the bore axis. By this, torques can be transmitted by means of the toothings. Other angles between 0° and 180° in reference to the bore axis can, however, also be provided. To ensure a defined position of the bearing elements in radial direction in reference to the longitudinal axis and to prevent a rotational displacement of the bearing elements, it can be provided that the first attachment faces have projections against which the bearing elements are supported in the radial direction. Further, key and groove connections can be provided in the first attachment faces and in the second attachment faces.

The teeth of the toothings may also extend radially towards a center point arranged in the plane formed by the longitudinal axis and the bore axis. By this, it is, on the one hand, achieved that forces can be transmitted via the toothings. On the other hand, a defined position of the bearing element and, therefore, of the bore axis is predetermined.

The teeth of the toothings may extend, respectively, parallel to each other in two areas, and the extensions of the teeth of the one area and of the teeth of the other area intersect each other at an angle. Preferably, the connection face has centering means for centering the flange element in reference to a longitudinal axis of the counter-flange. These centering means may be represented by a Hirth-end face serration.

The flange element can be connected to the counter-flange by means of connection screws, and through bores, through which the connection screws are passed, are provided in the flange element.

Preferably, the through bores for the connection screws end, respectively, starting from the connection face, in a first clamping face serving for the abutment of a nut or of a screw head. Preferably, here, it is provided that the flange element has an outer circumferential face in which two pockets, offset to each other by 180°, are provided and are, respectively, arranged in an area between two through bores for attachment screws of a bearing element and which, respectively, form a second clamping face.

The flange element may also have two recesses extending, respectively, about the circumference between two first attachment faces and which, respectively, form a second clamping face as well.

Generally it is also possible to weld the flange element to a counter-flange.

Preferably, the flange element is hardened by nitration, and the bearing elements are case hardened.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
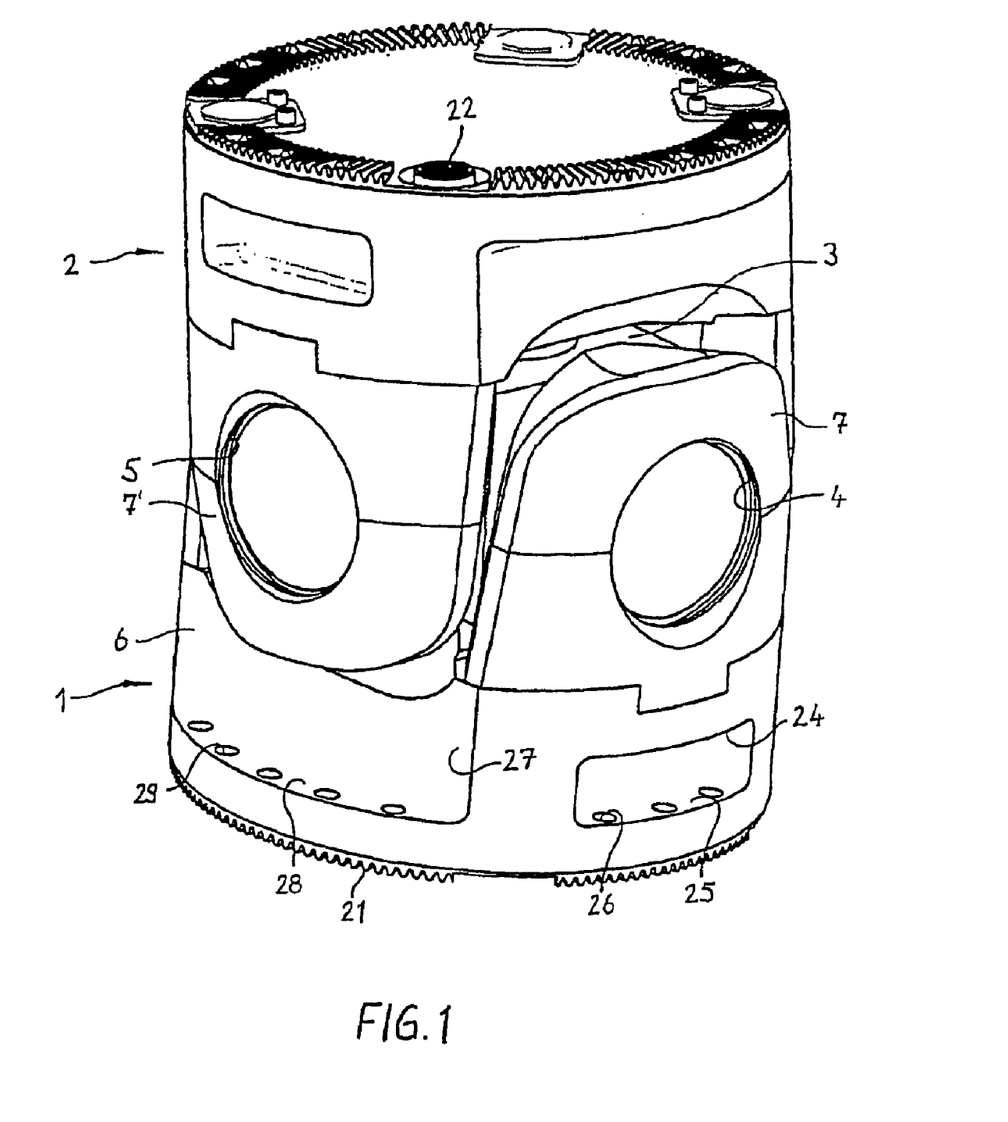
FIG. 1 is a perspective view of a universal joint with two flange yokes according to the invention.

FIG. 1 shows a universal joint including a first flange yoke 1, a second flange yoke 2, and a journal cross 3. The journal cross 3 has four journals that are arranged in pairs on a common journal axis and are supported in bearing bores 4, 5 of the flange yokes 1, 2, respectively. The flange yokes 1, 2 are formed identically, and the structures of the flange yokes 1, 2 are described by means of the first flange yoke 1 shown in FIGS. 2, 3, and 4.

Figure 2:
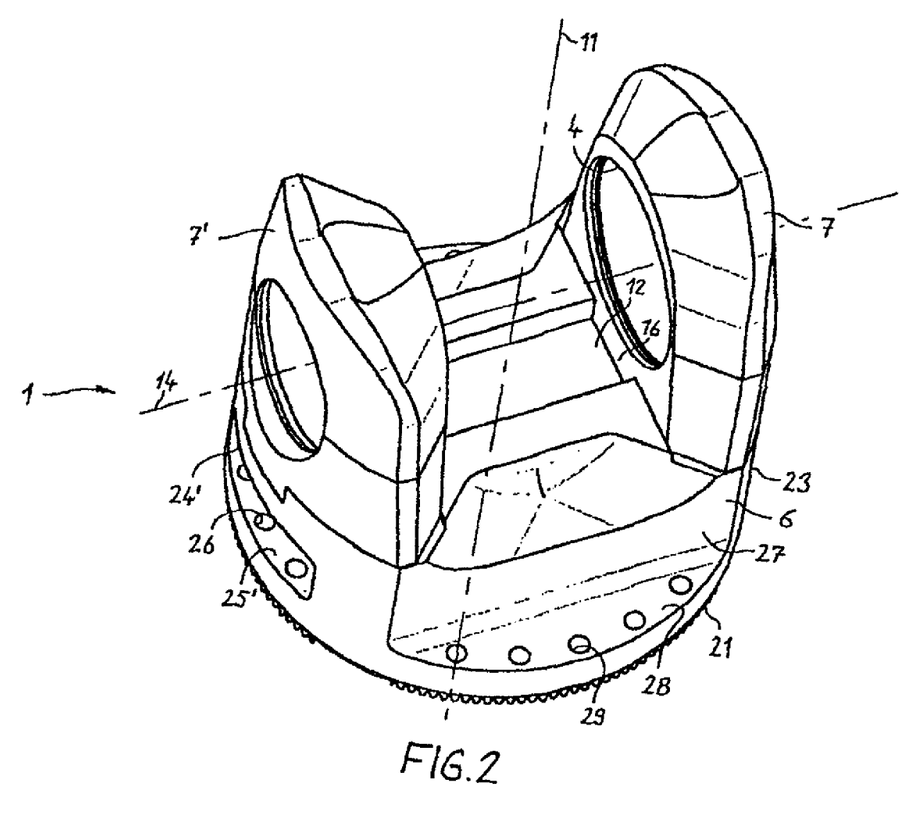
FIG. 2 is a perspective view of one of the flange yokes illustrated in FIG. 1.
Figure 3:
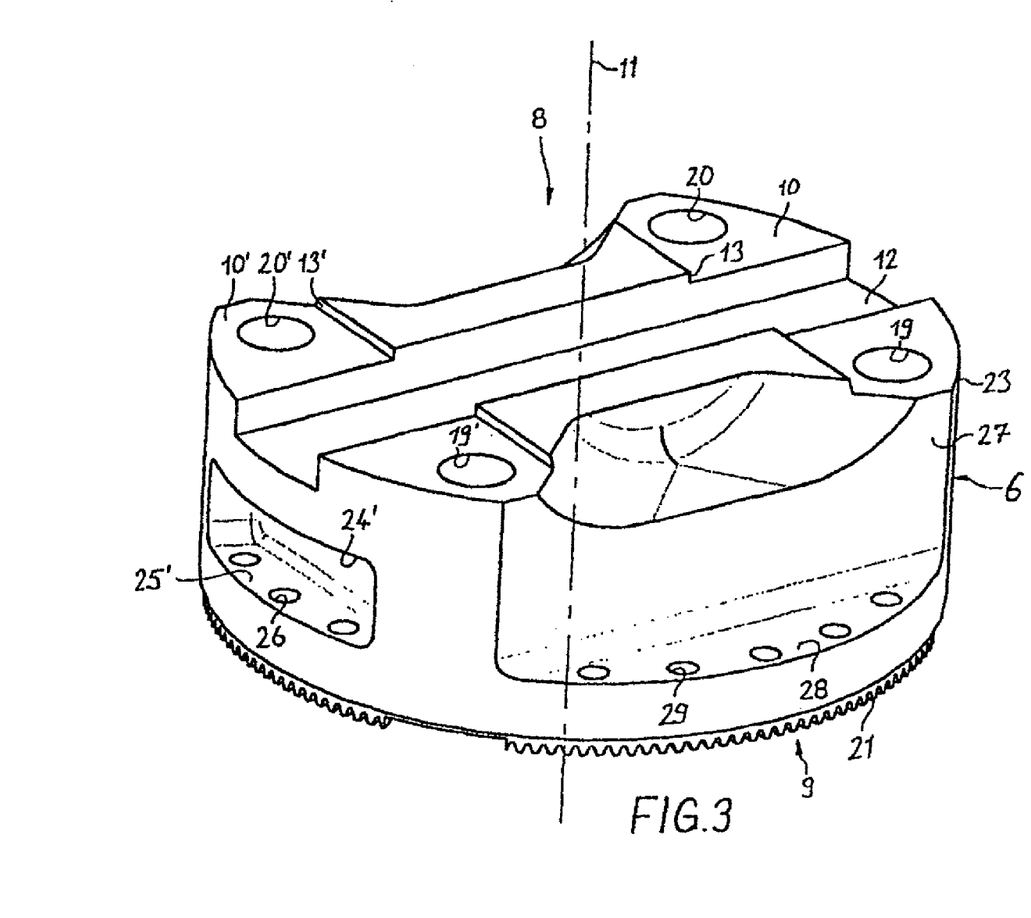
FIG. 3 is a perspective view of a flange element of the flange yoke illustrated in FIG. 2.

The first flange yoke 1 includes a flange element 6, as well as two bearing elements 7, 7' that are detachably connected to the flange element 6 by means of attachment screws. The flange element 6 has a first end face 8 and a second end face 9. On the first end face 8, two first attachment faces 10, 10' are arranged offset to each other by 180° on a common circumference around a longitudinal axis 11 of the flange element 6. In the first end face 8, furthermore, a radially extending groove 12 is provided that intersects the longitudinal axis 11 of the flange element 6 and extends through the first attachment faces 10, 10'. The first attachment faces 10, 10' merge in projections 13, 13', arranged, respectively, on the side of the corresponding first attachment faces 10, 10', facing inwards to the longitudinal axis 11 of the flange element 6 and projecting in the axial direction from the first end face 8.

Figure 4:
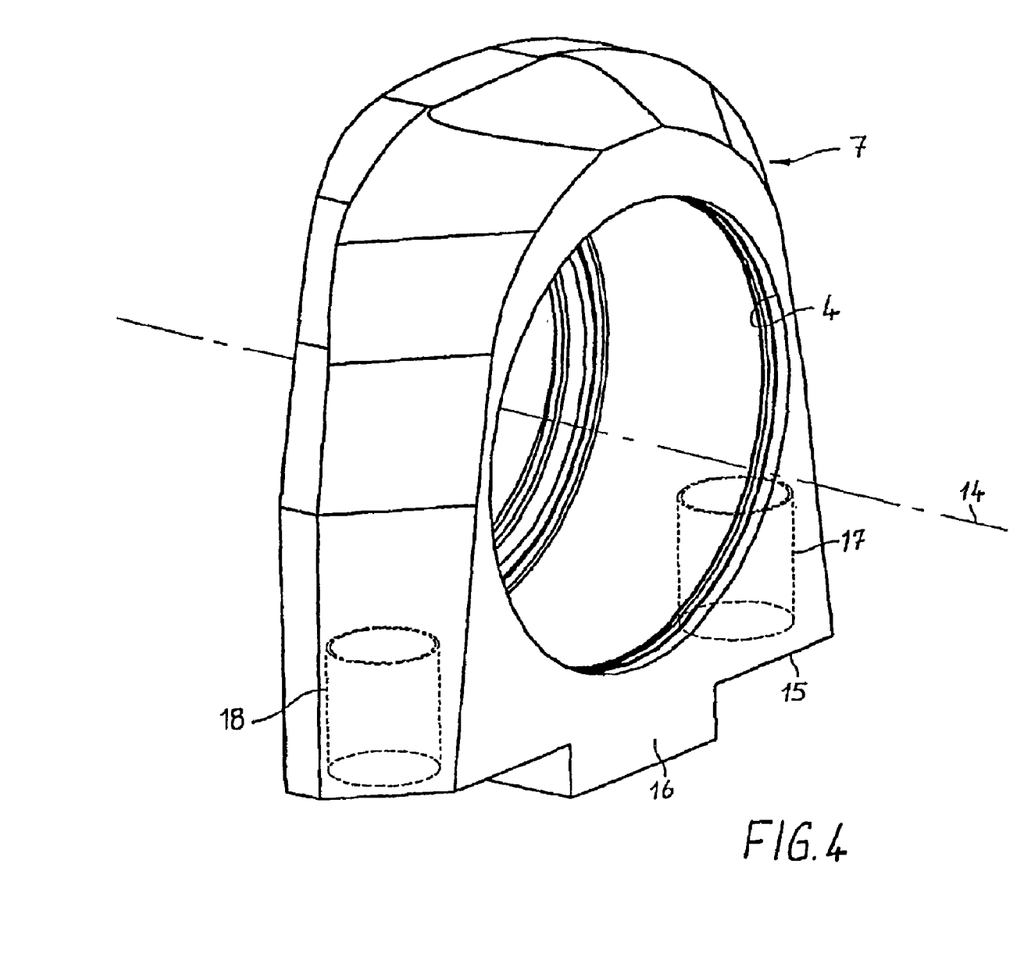
FIG. 4 is a perspective view of a bearing element of the flange yoke illustrated in FIG. 2.

The bearing elements 7, 7' are formed identically. FIG. 4 shows the bearing element 7 having a bearing bore 4 in which a journal of the journal cross 3 may be supportingly received. The bearing bore 4 has a bore axis 14 that intersects the longitudinal axis 11 of the flange element 6 at a right angle. The bearing element 7 has a second attachment face 15 on which a formation 16, formed fittingly to the groove 12 of the flange element 6, is arranged. Starting from the second attachment face 15, two blind holes 17, 18 are provided, each having an internal thread and extending parallel to the longitudinal axis 11 of the flange element 6. In the assembled condition of the bearing element 7, the blind holes 17, 18 are, respectively, arranged co-axially to through bores 19, 20, 19', 20', wherein the through bores 19, 20, 19', 20' start from the first attachment faces 10, 10' of the flange element 6 and are also arranged parallel to the longitudinal axis 11.

On the second end face 9 of the flange element 6, a connection face 21 is provided, to which the flange element 6 can be detachably connected by means of attachment screws 22. The connection face 21 is provided with a Hirth-end face serration, by which the flange element 6 can be centered relative to a longitudinal axis of a counter-flange 30 (see FIG. 5). Furthermore, a torque can be transmitted by means of the Hirth-end face serration without the attachment screws 22 being acted upon by shearing forces.

The flange element 6 has an outer circumferential face 23 in which two pockets 24, 24', offset to each other by 180°, are arranged. The pockets 24, 24' are, respectively, arranged in an area between the two through bores 19, 20, 19', 20' for the attachment screws 22 of a bearing element 7, 7'. The pockets 24, 24' form, respectively, a first clamping face 25, 25' that serves as the abutment face for nuts or screw heads. Through bores 26 end in the clamping face 25, 25' and extend parallel to the longitudinal axis 11. The through bores 26 serve for the attachment of the flange element 6 to the counter-flange 30 by means of connection screws 31.

The flange element 6 has, furthermore, two recesses 27, 27' extending, respectively, over the circumference between two first attachment faces 10, 10' and which form, respectively, a second clamping face 28, 28'. The clamping faces 28, 28' serve also as an abutment face for nuts or screw heads that are passed through bores 29. The through bores 29 start from the clamping faces 28, 28' and extend parallel to the longitudinal axis 11 of the flange element 6.

Figure 5:
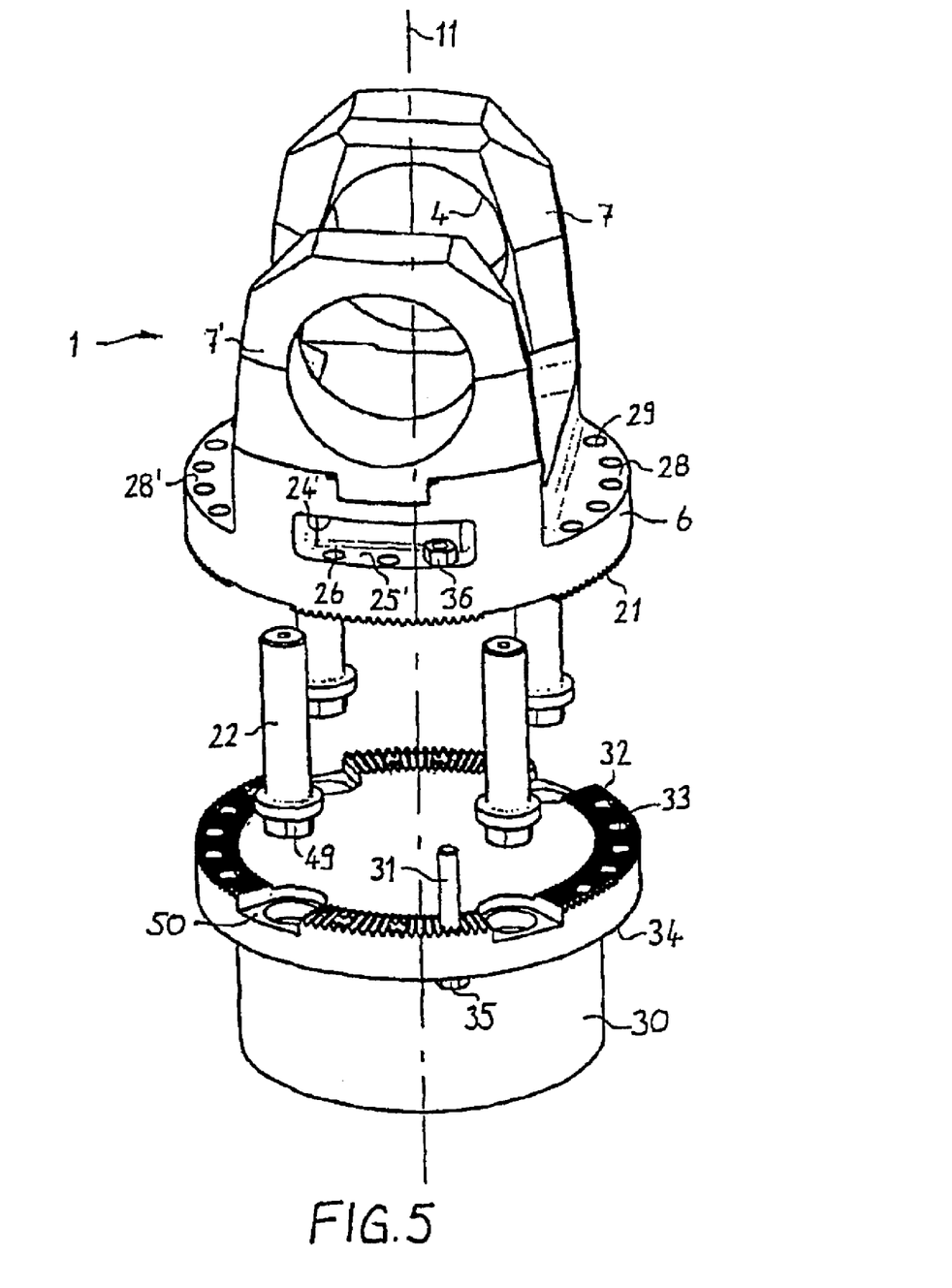
FIG. 5 is an exploded perspective view of the flange yoke according to the invention with a counter-flange, as well as with screws and connection screws.

FIG. 5 shows a first flange yoke 1 according to FIGS. 1 through 4 as described above. Further, the counter-flange 30 is shown as being connectable to the first flange yoke 1 via connection screws 31. The counter-flange 30 has a connection face 32 that is formed complimentary to the connection face 21 of the flange element 6. Starting from the connection face 32, through bores 33 extend parallel to the longitudinal axis 11 of the flange element 6. A connection screw 31 is shown in FIG. 5 that is representative for the other connection screws. The connection screw 31 is passed through one of the through bores 33 starting from a face 34, wherein a screw head 35 of the connection screw 31 abuts the face 34. The connection screw 31 can also be passed through one of the through bores 26 of the flange element 6. By means of a nut 36 supported on the clamping face 25' of the pocket 24', the connection screw 31 is secured.

Alternatively, it is also possible to provide in the flange element 6 blind holes with internal threads, into which the connection screws in form of a stud are screwed. The studs are then passed through the through bores in the counter-flange 30 and are secured by means of screw nuts.

The attachment screws 22 can be passed, starting from the connection face 21, through the through bores 19, 20, 19', 20' of the flange element 6, and screwed into the respective blind holes of the bearing element 7, 7'. Screw heads 49 of the attachment screw 22 enter, in the mounted condition of the counter-flange 30, into recesses 50 in the connection face 32.

Figure 6:
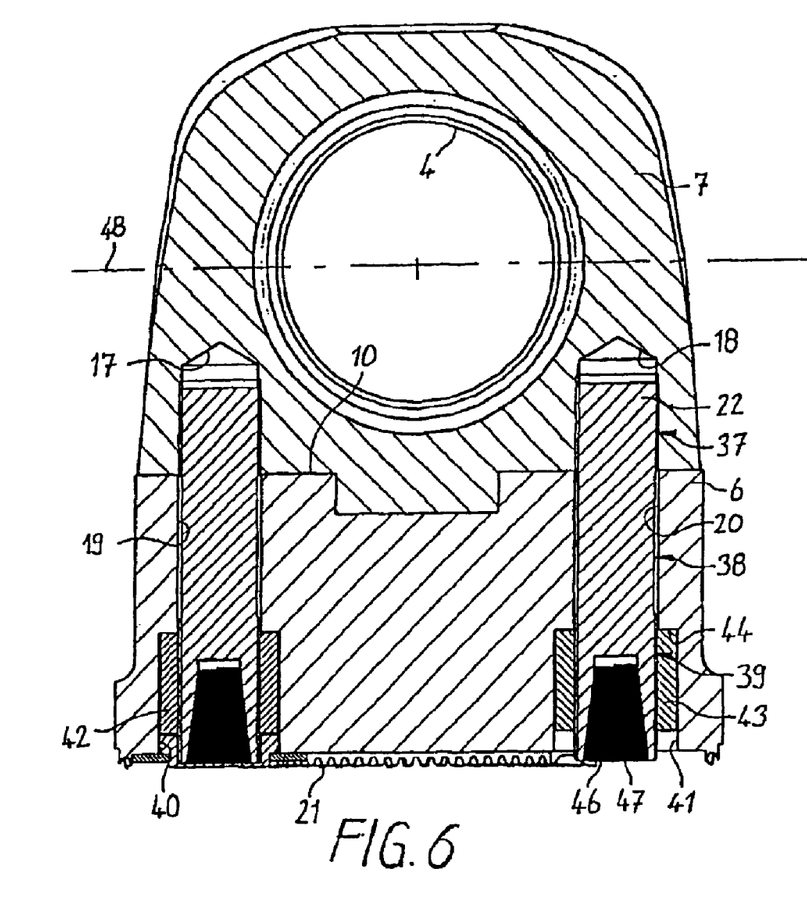
FIG. 6 is a sectional elevational view of the flange element and the bearing element which are connected to each other by means of attachment screws parallel to the longitudinal axis.

FIG. 6 shows the attachment of the bearing element 7 to the flange element 6. The bearing element 7 and the flange element 6 are, in this case, represented in cross section in a plane extending parallel to the longitudinal axis 11 of the flange element 6 and through the attachment screws 22. The attachment screws 22 have, respectively, a first threaded portion 37 with which the attachment screws 22 are inserted into the blind holes 17, 18 of the bearing element 7. An expansion portion 38 is formed continuous with the first threaded portion 37 and has no thread. A second threaded portion 39, arranged within the through bores 19, 20, again follows the expansion portion 38. The through bores 19, 20 merge, starting from the first attachment face 10, in a bore area 40, 41 having a larger diameter. Within this bore area 40, 41, respectively, a nut 42, 43 is arranged that is screwed onto the second threaded portion 39 of one of the attachment screws 22 and abuts a shoulder 44, 45 in the transition to the bore area 40, 41 having an enlarged diameter. Furthermore, the attachment screws 22 have, starting from the end faces 46 facing away from the bearing element 7, tapered internal threads 47 that extend towards the screw axis.

For the attachment of the bearing element 7, the screws 22 are initially inserted into the blind holes 17, 18 with the internal threads. Then, the attachment screws 22 can expand by means of threaded bolts that are insertable into the tapered internal threads 47. In the expanded condition of the attachment screws 22, the nuts 42, 43 can then be screwed onto the second threaded portions 39. After the removal of the threaded bolts from the tapered internal threads 47, the attachment screws 22 are, therefore, pre-tensioned. Therefore, a connection with a defined pre-tensioning can be achieved, wherein the attachment screws 22 are not acted upon by torsion.

So that the connection face 21 of the flange element 6 terminates flush, the ends of the attachment screws 22 formed by the second threaded portion 39 are taken up sunk in the connection face 21.

From this representation, it can also be taken that the cross-section of the bearing element 7 in a plane formed by the journal axes of a journal cross is not reduced by the blind holes 17, 18. For example, in FIG. 6, such a plane 48 is represented for the case that the universal joint is not angled.

FIGS. 7 through 16 show further examples of embodiments of bearing elements with attachment faces having a toothing. Components in those figures that by means of attachment screws correspond to components of FIGS. 1 through 6 are provided with reference numerals which are increased by a multiple of the value 100 and are as described in connection with FIGS. 1 through 6.

Figure 7:
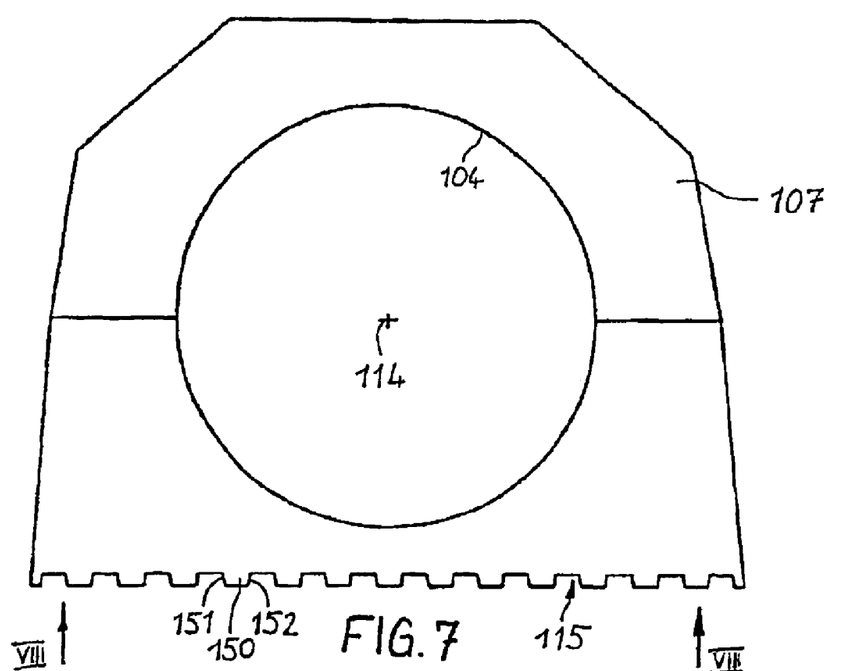
FIG. 7 is a side elevational view of a second embodiment of a bearing element in accordance with this invention.
Figure 8:
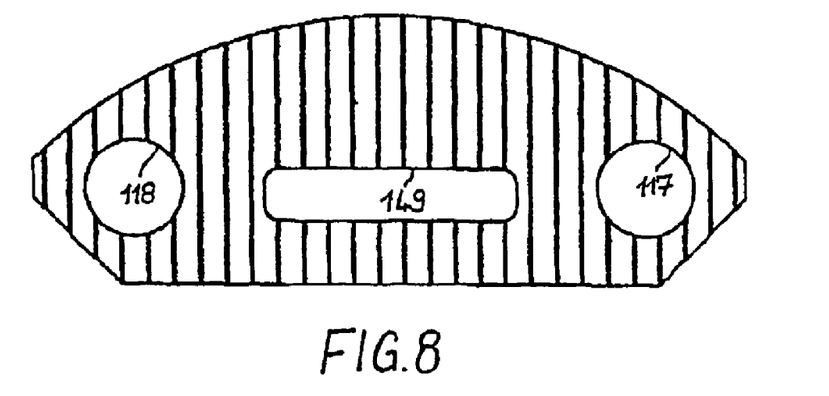
FIG. 8 is a bottom elevational view of the second embodiment of the bearing element taken along line 8—8 of FIG. 7.

In a second embodiment of the invention illustrated in FIGS. 7 and 8, the bearing element 107 has a spur toothing. To absorb radial forces that act from the bearing element 107 in radial direction towards the longitudinal axis, a groove 149 for a key and groove connection is provided in the attachment face 121. The teeth 150 of the toothing have steep tooth flanks 151, 152. These are preferably formed in such a way that, when screwing-in for the first time, a plastic deformation is produced.

Figure 9:
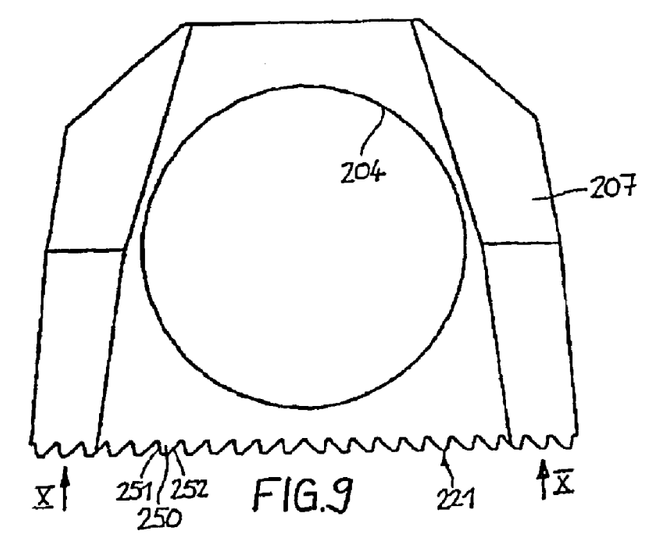
FIG. 9 is a side elevational view of a third embodiment of a bearing element in accordance with this invention.
Figure 10:
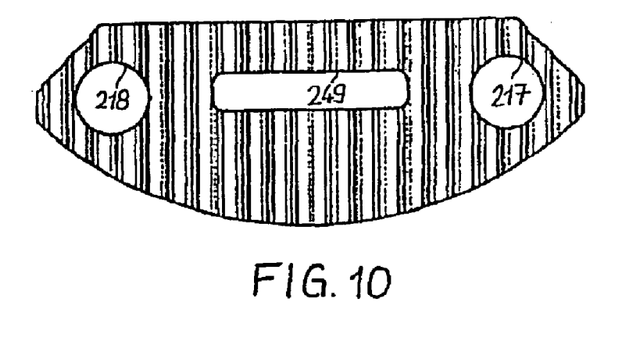
FIG. 10 is a bottom elevational view of the third embodiment of the bearing element taken along line 10—10 of FIG. 9.

In a third embodiment of the invention illustrated in FIGS. 9 and 10, the bearing element 207 also has a spur toothing. A groove 249 for a key and groove connection is also provided in the attachment face 221. The teeth 250 of the toothing have tooth flanks 251, 252 with different angles.

Figure 11:
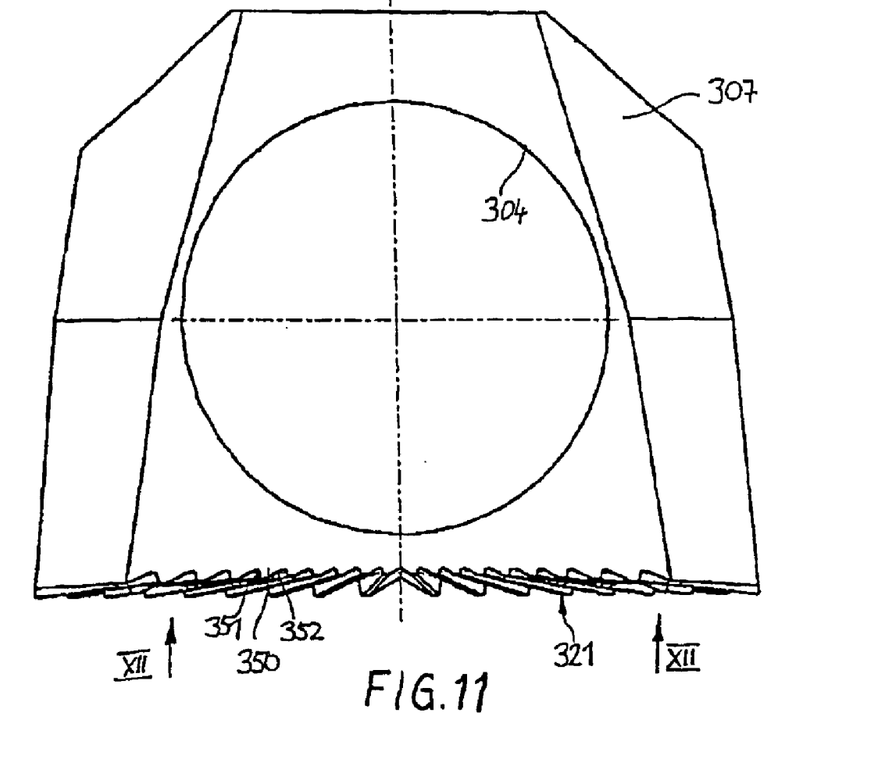
FIG. 11 is a side elevational view of a fourth embodiment of a bearing element in accordance with this invention.
Figure 12:
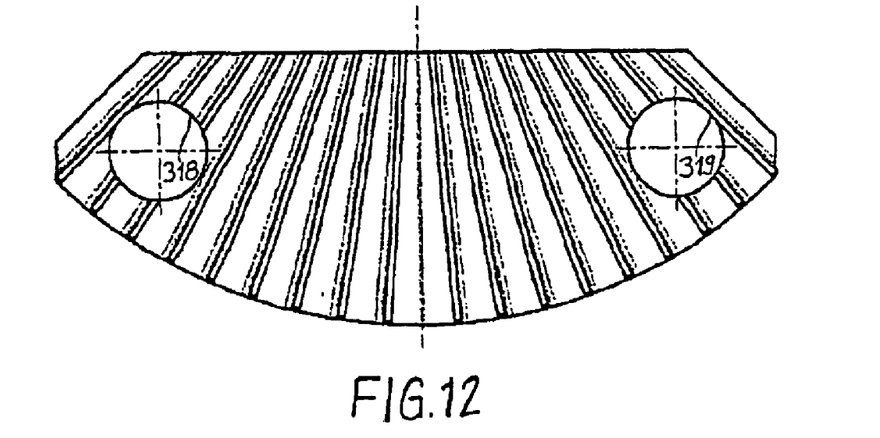
FIG. 12 is a bottom elevational view of the fourth embodiment of the bearing element taken along line 12—12 of FIG. 11.
Figure 13:
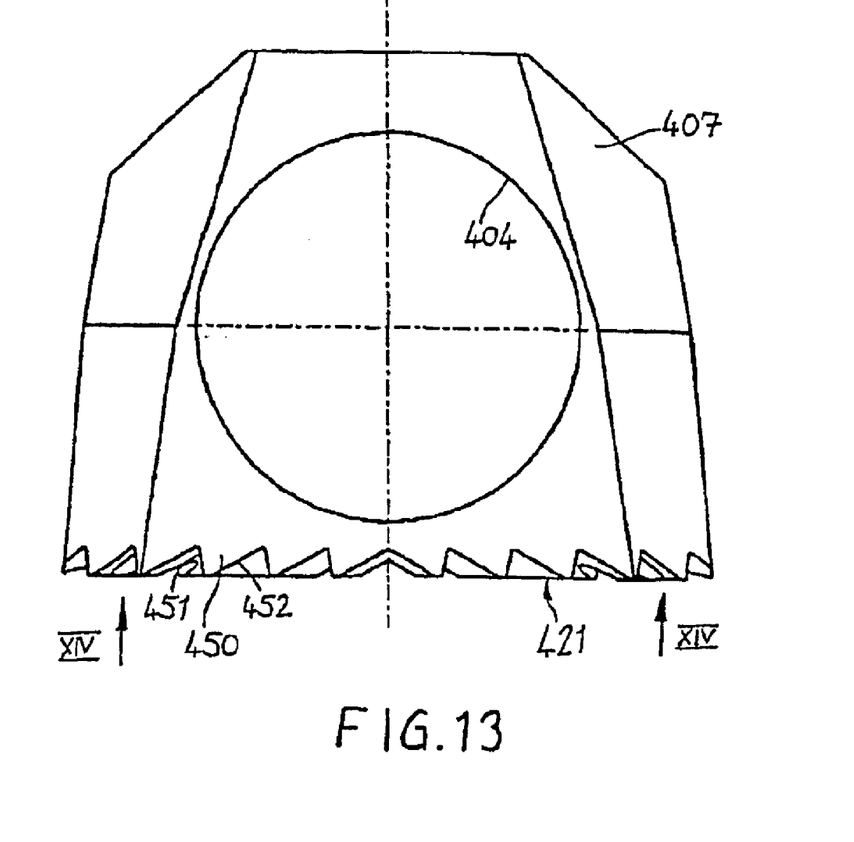
FIG. 13 is a side elevational view of a fifth embodiment of a bearing element in accordance with this invention.
Figure 14:
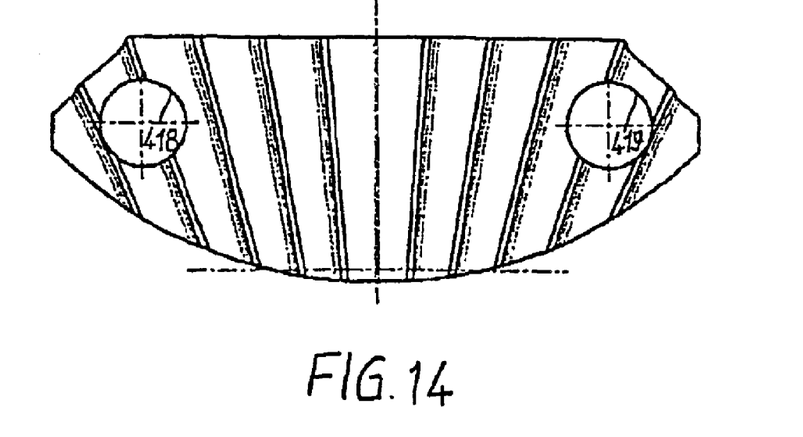
FIG. 14 is a bottom elevational view of the fifth embodiment of the bearing element taken along line 14—14 of FIG. 13.

In fourth and fifth embodiments of the invention respectively illustrated in FIGS. 11 and 12 and in FIGS. 13 and 14, a bearing element 307, 407 has a toothing, which teeth 350, 450 extend radially towards a center point that is arranged in the plane of the attachment face 321, 421. This Hirth-end face serration has the advantage that no additional means for the radial alignment or for the absorption of radial forces, respectively, have to be provided. The tooth flanks 351, 352 and 451, 452 enclose, further, with the plane of the attachment face 321, 421, angles of different size.

Figure 15:
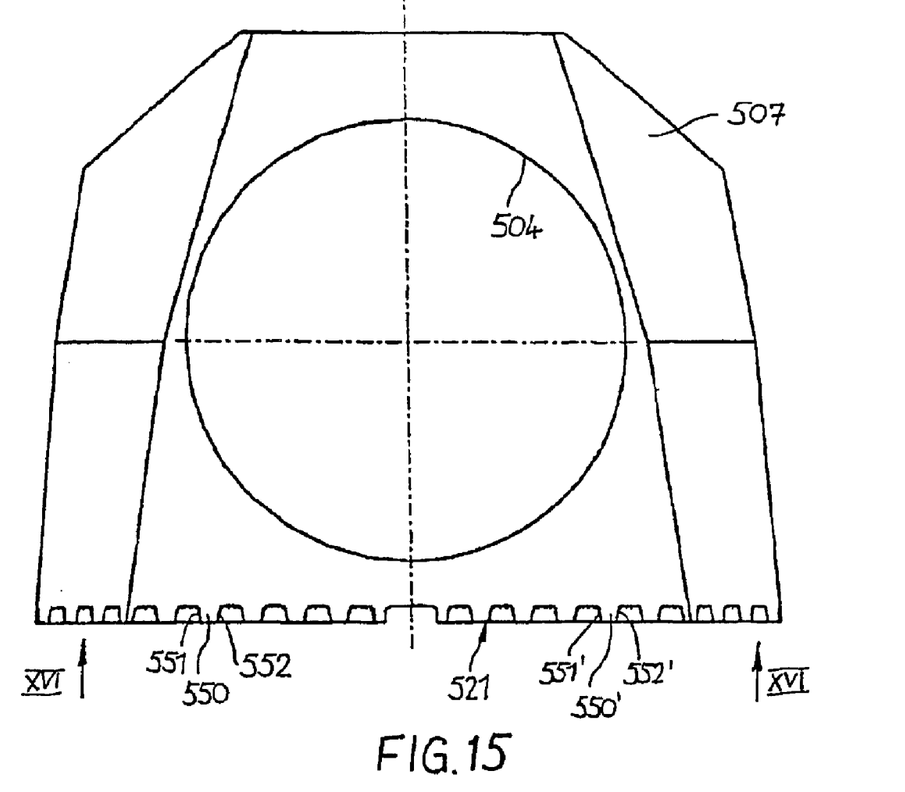
FIG. 15 is a side elevational view of a sixth embodiment of a bearing element in accordance with this invention.
Figure 16:
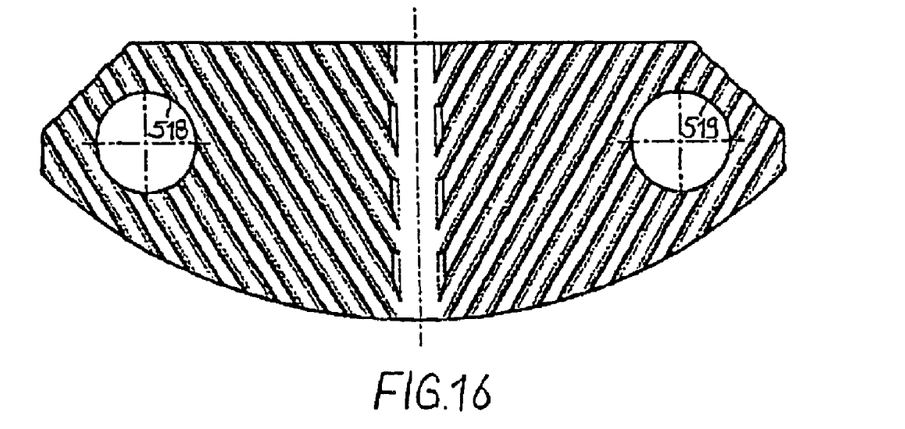
FIG. 16 is a bottom elevational view of the sixth embodiment of the bearing element taken along line 16—16 of FIG. 15.

In a sixth embodiment of the invention illustrated in FIGS. 15 and 16, a bearing element 507 has a toothing, which teeth 550, 550' extend in two areas, respectively, parallel to each other, wherein the imaginative extensions of the teeth 550 of the one area and that of the teeth 550' of the other area intersect each other at an angle. By this, it is also, as with a Hirth-end face serration, prevented that separate means for the absorption of radial forces have to be provided.

Figure 17:
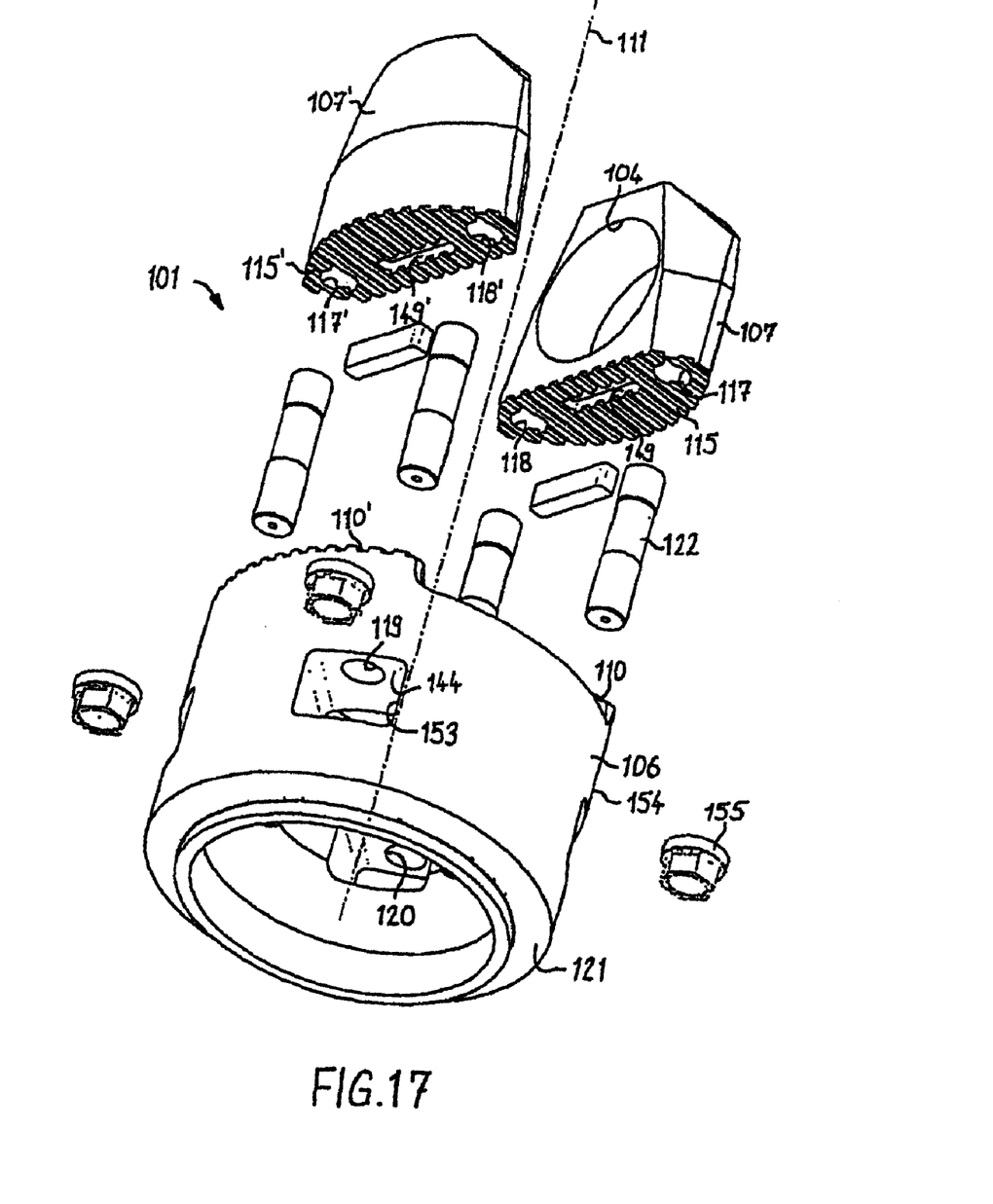
FIG. 17 is an exploded perspective view of a flange yoke with a flange element which is provided with pockets in its outer circumferential face which form the clamping faces.

FIG. 17 shows an alternative embodiment of a flange yoke 101. Components that correspond to components of the flange yoke according to FIGS. 1 through 5 are provided with reference numerals that are increased by the value 100 and are as described above in connection with FIGS. 1 through 5.

The flange yoke 101 has bearing elements 107, 107' according to FIGS. 7 and 8. For attaching the bearing elements 107, 107', attachment screws 122 are screwed into the blind holes with internal threads 117, 117', 118, 118'. Next, the attachment screws 122, which are formed as studs, are passed through bores 119, 120 of the flange element 106. The through bores 119, 120 start, respectively, from one of the first attachment faces 110, 110' and end, respectively, in a first clamping face 144. The first clamping faces 144 are, respectively, formed by respective recesses 153 that are provided in an outer circumferential face 154. Onto the screw ends of the attachment screws 122, which are passed through the through bores 119, 120, screw nuts 155 are screwed that abut the first clamping faces 144.

For connecting the flange element 106 to a counter-flange (not shown), a connection face 121 is provided by which the flange element 106 can be welded to a counter-flange.

Figure 18:
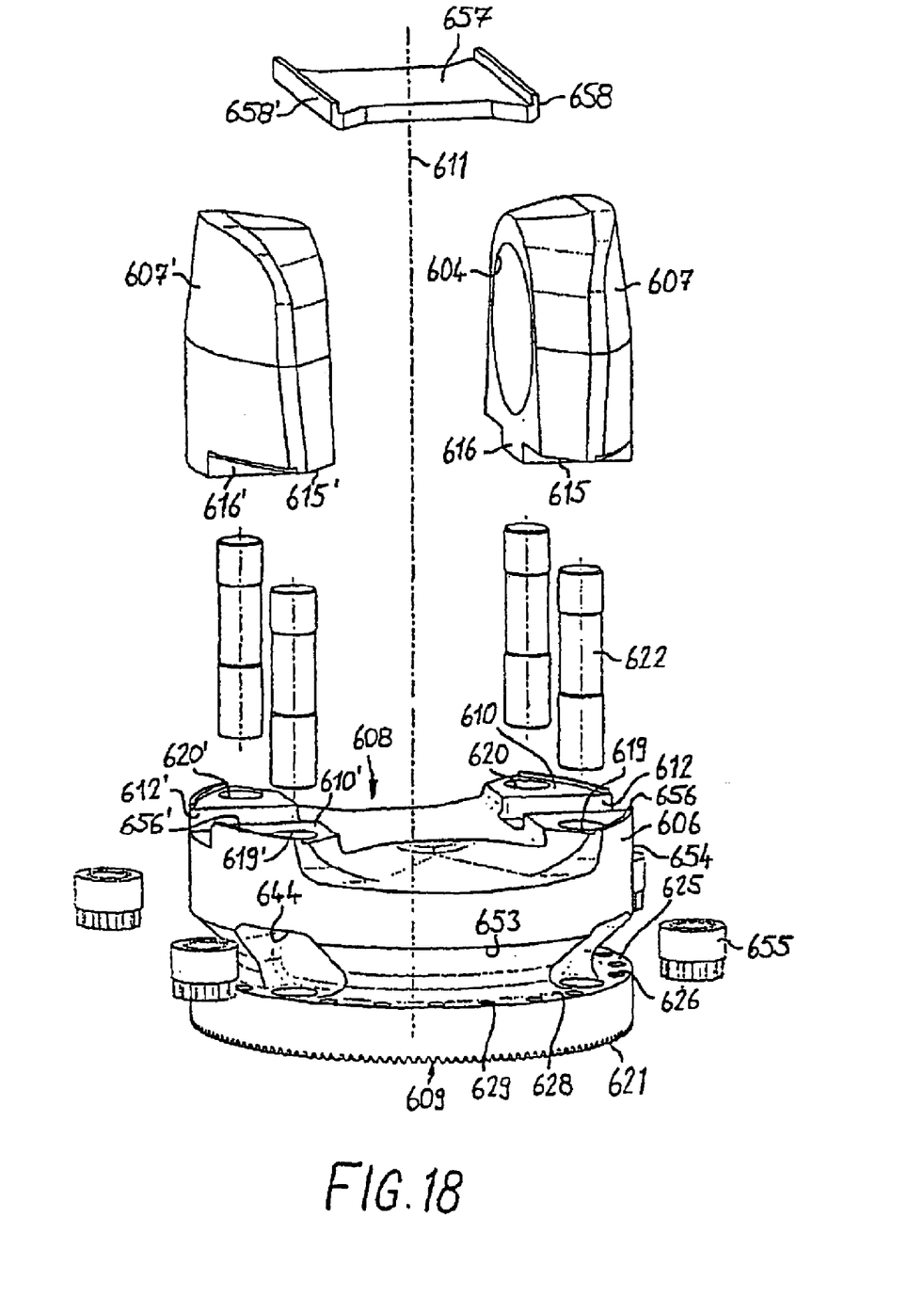
FIG. 18 is an exploded perspective view of a flange yoke with a flange element which is provided with a circumferential groove in its outer circumferential face which forms the clamping faces.

A further embodiment of a flange yoke is shown in FIG. 18. Components that correspond to components of the flange yoke according to FIGS. 1 through 5 are provided with reference numerals that are increased by the numerical value 600 and are as described above in connection with FIGS. 1 through 5.

The bearing elements 607, 607' correspond to those of the flange yoke according to FIGS. 1 to 5, wherein, however, the bearing bores 604 are closed towards the outside. The attachment screws 622 are screwed for the attachment of the bearing elements 607, 607' into the blind holes with internal threads of the bearing elements. The attachments screws 622 are formed as studs and are passed through the through bores 619, 619', 620, 620' of the flange element 606. The through bores 619, 619', 620, 620' extend from the first attachment faces 610, 610' and end, respectively, in a first clamping face 644. Onto the screw ends of the attachment screws 622, screw nuts 655 are screwed that abut the first clamping face 644. The first clamping faces 644 are formed by a circumferential groove 653 in an outer circumferential face 654 of the flange element 606. Furthermore, the circumferential groove 653 forms the second clamping faces 625, 628, from which through bores 626, 629 extend, ending in the connection face 621. Through these through bores 626, 629, connection screws for connecting the flange element 606 to a counter-flange, can be passed.

To prevent a rotational displacement of the bearing elements 607, 607', the first attachment faces 610, 610' have projections 656, 656' that merge in the outer circumferential face 654 and against which the bearing elements 607, 607' can be radially supported. Furthermore, a pressure plate 657 is provided that is arranged between the two bearing elements 607, 607' and that is supported with the end faces 658, 658' on the bearing elements 607, 607'.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A flange yoke for a universal joint, especially for a universal joint for the transmission of high torques, comprising:

a flange element having a longitudinal axis, two first attachment faces that are arranged offset to each other by 180° on a first end face of the flange element on a common circumference around the longitudinal axis, a connection face that is arranged on a second end face of the flange element by which the flange element is connectable to a counter flange, and two bearing elements, each having a bearing bore that is arranged co-axially on a common bore axis that intersects the longitudinal axis of the flange element at a right angle, a second attachment face that abuts one of the first attachment faces of the flange element, and at least two blind holes with internal threads that extend parallel to the longitudinal axis of the flange element starting from the second attachment face, wherein for each blind hole a through bore is arranged that extends parallel of the longitudinal axis in the flange element, wherein the through bores respectively start from a first clamping face and end in one of the first attachment faces, and wherein attachment screws are passed through the through bores and are supported, respectively, via a screw nut or a screw head on the respective first clamping face and sit in the blind holes.

2. A flange yoke according to claim 1, characterized in that respectively, starting from the first clamping face, the through bores merge in a bore having a larger diameter and that ends in the connection face.

3. A flange yoke according to claim 1, characterized in that the flange element has an outer circumferential face that is provided with recesses forming the first clamping face.

4. A flange yoke according to claim 1, characterized in that the flange element has an outer circumferential face that is provided with a circumferential groove forming the first clamping face.

5. A flange yoke according to claim 1, characterized in that the first attachment faces and the second attachment faces have means for the transmission of forces in a plane arranged at a right angle to the longitudinal axis, and further have means for centering the bearing elements.

6. A flange yoke according to claim 5, characterized in that the first attachment faces of the flange element have, respectively, a groove that extends radially to the longitudinal axis, and that the second attachment faces of the bearing elements have, respectively, a correspondingly formed formation.

7. A flange yoke according to claim 5, characterized in that the first attachment faces have toothings, and that the second attachment faces have toothings formed complimentary to the toothings formed in the first attachment faces.

8. A flange yoke according to claim 7, characterized in that the teeth of the toothings have, respectively, a first tooth flank that extend at a steep angle to a plane, are arranged at a right angle to the longitudinal axis, and have, respectively, a second tooth flank that extends at a low-gradient angle to the plane.

9. A flange yoke according to claim 7, characterized in that the teeth of the toothing extend parallel to the bore axis.

10. A flange yoke according to claim 5, characterized in that the first attachment faces have projections against which the bearing elements are supported in the radial direction.

11. A flange yoke according to claim 5 characterized in that key and groove connections are provided in the first attachment faces and in the second attachment faces.

12. A flange yoke according to claim 7, characterized in that the teeth of the toothing extend radially towards a center point and are arranged in a plane formed between the longitudinal axis and the bore axis.

13. A flange yoke according to claim 7, characterized in that the teeth of the toothing extend, respectively, parallel to each other in two areas and that an extension of the teeth of the one area and of the teeth of the other area intersect each other at an angle.

14. A flange yoke according to claim 1, characterized in that the connection face has centering means for centering the flange element in reference to a longitudinal axis of the counter-flange.

15. A flange yoke according to claim 14, characterized in that the centering means are represented by a Hirth-end face serration.

16. A flange yoke according to claim 1, characterized in that the flange element is connectable to the counter-flange by means of connection screws, and that through bores, through which the connection screws are insertable, are provided in the flange element.

17. A flange yoke according to claim 16, characterized in that the through bores for the connection screws, respectively, starting from the connection face, end in a second clamping face that serves for the abutment of a nut or a screw head.

18. A flange yoke according to claim 17, characterized in that the flange element has an outer circumferential face in which two pockets are offset to each other by 180° and are, respectively, arranged in an area between two through bores for attachment screws of a bearing element and which, respectively, form a second clamping face.

19. A flange yoke according to claim 17, characterized in that the flange element has two recesses that extend, respectively, over the circumference between two first attachment faces and that, respectively, form a second clamping face.

* * * * *

UNITED STATES PATENT AND TRADEMARK OFFICE
CERTIFICATE OF CORRECTION

PATENT NO. : 6,881,152 B2
DATED : April 19, 2005
INVENTOR(S) : Erlmann, Nikolaus Martin It is certified that error appears in the above-identified patent and that said Letters Patent is hereby corrected as shown below:

Column 8,
Line 37, change "of" to -- to --.

Signed and Sealed this

Fourteenth Day of June, 2005

JON W. DUDAS
*Director of the United States Patent and Trademark Office*